United States Patent
Kelley et al.

(10) Patent No.: US 7,264,896 B2
(45) Date of Patent: Sep. 4, 2007

(54) TWO-STAGE HYBRID GAS PRESSURE REGULATOR

(75) Inventors: Ronald James Kelley, Coral Springs, FL (US); Steven Duane Pratt, Fort Lauderdale, FL (US); Robert Pennisi, Boca Raton, FL (US); Sivakumar Muthuswamy, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 705 days.

(21) Appl. No.: 10/219,582

(22) Filed: Aug. 15, 2002

(65) Prior Publication Data
US 2004/0033400 A1 Feb. 19, 2004

(51) Int. Cl.
*H01M 8/04* (2006.01)
*F24F 11/00* (2006.01)
*G05D 16/06* (2006.01)
*F16K 31/12* (2006.01)

(52) U.S. Cl. .................... 429/25; 429/22; 454/238; 236/92 A; 137/505.12

(58) Field of Classification Search .............. 429/25; 454/238; 236/92 A
See application file for complete search history.

(56) References Cited

U.S. PATENT DOCUMENTS

| 4,904,547 | A | * | 2/1990 | Mizumoto et al. | 429/22 |
| 6,127,058 | A | | 10/2000 | Pratt et al. | 429/30 |
| 6,268,077 | B1 | * | 7/2001 | Kelley et al. | 429/33 |
| 6,569,549 | B1 | * | 5/2003 | Sawyer | 429/13 |
| 6,591,926 | B2 | * | 7/2003 | Oglesby et al. | 180/65.3 |
| 6,638,654 | B2 | * | 10/2003 | Jankowksi et al. | 429/26 |
| 2002/0164515 | A1 | * | 11/2002 | Oglesby et al. | 429/34 |
| 2003/0082427 | A1 | * | 5/2003 | Prasad et al. | 429/34 |

* cited by examiner

*Primary Examiner*—John S. Maples
(74) *Attorney, Agent, or Firm*—Charles W. Bethards

(57) ABSTRACT

A gas pressure regulator (100) includes a mechanical primary stage (102), preferably including a spring valve, and an electronic secondary stage (104), preferably including a micromachined pressure regulator, the combination of the mechanical primary stage and the electronic secondary stage suitable for relatively precise low pressure near zero flow rates with reasonable energy consumption rates, such as encountered when supplying fuel to a low power fuel cell system.

22 Claims, 1 Drawing Sheet

TWO-STAGE HYBRID GAS PRESSURE REGULATOR

BACKGROUND OF THE INVENTION

1. Field of the Invention

This invention relates in general to gas pressure controllers and equipment, and more specifically to a two-stage hybrid gas pressure regulator suitable for use therein.

2. Description of the Related Art

Mechanical gas pressure regulators have been used for many years to reduce the pressure of a gas as the gas flows from a high-pressure fuel source to an end-use gas-consuming appliance. One gas-consuming appliance that is currently finding its way into portable electronic devices is the portable fuel cell. Fuel cells hold the promise of extending the operating time of portable electronic devices between charges, because of their high energy density—more than ten times that of conventional rechargeable batteries.

Unfortunately, fuel cells for portable applications can create some problems for conventional mechanical gas regulators. One problem is that such fuel cells require a precise, low gas pressure that must be maintained over a wide range of supply pressures. A second problem is that a fuel cell that is not under load can require near-zero gas flow, while the regulator still has to maintain the precise low pressure. Mechanical regulators do not lend themselves to great precision, particularly at near-zero gas flow. More recently, electronic regulators have been developed that can provide the precision and insensitivity to flow desirable for fuel cells. Electronic regulators, however, when used to reduce a typical high-pressure fuel source to the precise low pressure required for the fuel cell, require too much power for most portable electronic applications.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF THE PREFERRED EMBODIMENT

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

The terms a and an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The term program, as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

This disclosure discusses an apparatus for regulating a gas supply for a fuel cell and other similar appliances that advantageously provides the requisite pressure precision at all expected gas flow rates including near zero flow, while operating at a sufficiently low power level or energy consumption rate for portable electronic applications.

Figure 1:
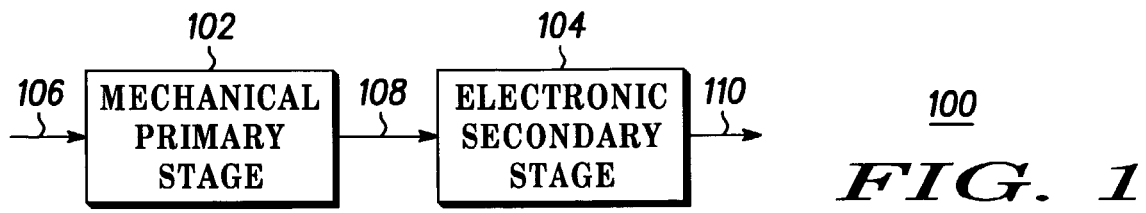
FIG. 1 is a block diagram of an exemplary two-stage hybrid gas pressure regulator in accordance with the present invention.

Referring to FIG. 1, a block diagram depicts an exemplary two-stage hybrid gas pressure regulator 100 in accordance with the present invention, comprising a gas supply input 106 coupled to a mechanical primary stage 102 having a primary stage output 108. The primary stage output 108 is coupled to an electronic secondary stage 104 having a secondary stage output 110. The mechanical primary stage 102 preferably comprises a conventional spring valve, e.g., a check valve, such as the R800-Series regulator valve manufactured by Airtrol Components, Inc., 17400 West Liberty Lane, New Berlin, Wis. 53146. The electronic secondary stage 104 preferably comprises a micromachined pressure regulator including a micromachined valve and a microcontroller. An example of such a micromachined pressure regulator is the TiNi Microvalve manufactured by TiNi Alloy Company, 1619 Neptune Drive, San Leandro, Calif. 94577. It will be appreciated that, alternatively, other similar types of mechanical and electronic regulator valves can be utilized for the mechanical primary stage 102 and the electronic secondary stage 104.

The combination of the mechanical primary stage 102 and the electronic secondary stage 104 produces advantageous results when applied to a fuel cell system, as described further herein below. First, a fuel cell for a portable application requires a precisely controlled gas pressure, e.g., between 0.5 and 1.0 pounds per square inch (between 0.34 and 0.69 Newtons per square cm) for proper operation. Second, the fuel cell requires that the pressure be maintained precisely even when there is near-zero gas flow through the regulator, such as can occur when the fuel cell is operated with no electrical load. A two-stage mechanical regulator can provide sufficient precision for a fuel cell under nominal operating gas flow conditions. Under a near-zero gas flow, however, the two-stage mechanical regulator loses precision to a degree that is unacceptable for a fuel cell for portable applications.

An electronic regulator, on the other hand, can maintain sufficient precision at near-zero gas flow. Unfortunately, the electronic regulator consumes too much power, e.g., one watt, when operating at the high inlet pressures typically provided by known fuel cell gas supply systems, such as hydride fuel systems.

An advantage of the combination of the mechanical primary stage 102 and the electronic secondary stage 104, in accordance with the present invention, is that the mechanical primary stage 102 provides a coarse regulation from the maximum supply pressure, e.g., 200 pounds per square inch (138 Newtons per square cm), to a reduced intermediate pressure level, e.g., 20 pounds per square inch (13.8 Newtons per square cm). The reduced intermediate pressure level allows the electronic secondary stage 104 to operate at a much lower power level, e.g., 100 milliwatts, more suitable for portable electronic devices, while maintaining the required precision. A second advantage of the combination is that the mechanical primary stage 102 does not have to be very precise, allowing the use of an inexpensive structure, such as a simple spring valve or check valve, for the mechanical primary stage 102. A third advantage is that the electronic secondary stage 104 can be physically separated from the mechanical primary stage 102, thereby facilitating microminiaturization. For example, the mechanical primary stage 102 can be attached directly to a hydride storage canister, while the electronic secondary stage 104 can be attached directly to the fuel cell. The two stages can then be connected by conventional tubing, e.g., copper tubing. In one embodiment, the electronic secondary stage 104 preferably comprises a micromachined valve attached to the plenum of the fuel cell.

Figure 2:
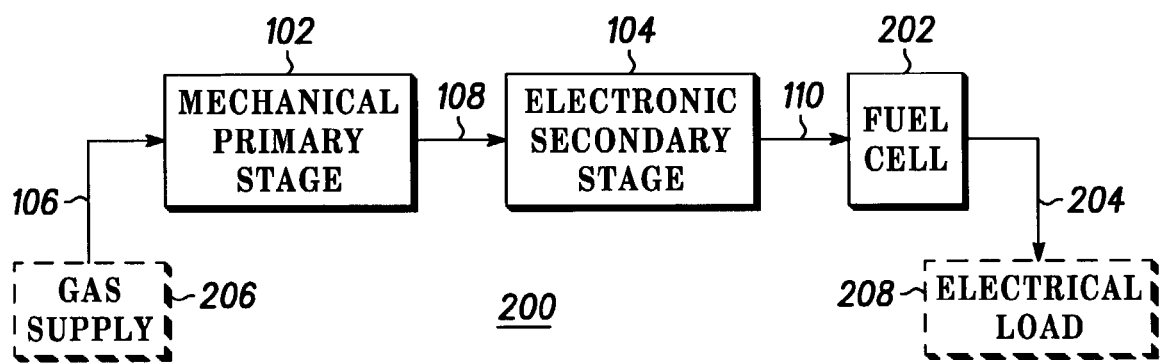
FIG. 2 is a block diagram of an exemplary fuel cell system coupled to a gas supply and an electrical load, in accordance with the present invention.

Referring to FIG. 2, a block diagram 200 depicts an exemplary fuel cell system, in accordance with the present invention, coupled to a gas supply 206 and an electrical load 208. The fuel cell system comprises the two-stage hybrid gas pressure regulator 100, coupled through the secondary stage output 110 to a conventional gas-powered fuel cell 202, such as one of the fuel cells or fuel cell systems described in U.S. Pat. No. 6,268,077, issued Jul. 31, 2001 to Kelley et al., and U.S. Pat. No. 6,127,058 issued Oct. 3, 2000 to Pratt et al, both assigned to the same assignee as here. It will be appreciated that, alternatively, other similar fuel cells can be utilized as well for the fuel cell 202.

Figure 3:
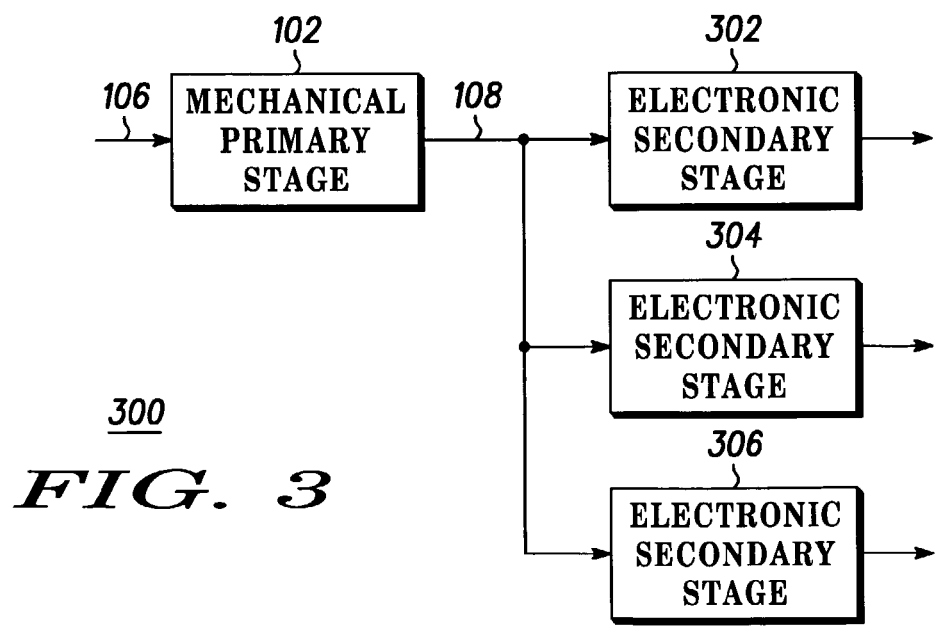
FIG. 3 is a block diagram of an exemplary alternative embodiment of the two-stage hybrid gas pressure regulator having a plurality of electronic secondary stages, in accordance with the present invention.

Referring to FIG. 3, a block diagram depicts an exemplary alternative embodiment 300 of the two-stage hybrid gas pressure regulator, in accordance with the present invention, comprising a plurality of electronic secondary stages 302, 304, 306. The plurality of electronic secondary stages 302, 304, 306 advantageously allow direct, individual regulation of gas pressure to each of a corresponding plurality of fuel cells (not shown) in a stack or array of cells, while utilizing only a single mechanical primary stage 102. This arrangement also advantageously lends itself to separation of the mechanical primary stage 102 from the plurality of electronic secondary stages 302-306, as may be necessary for optimum microminiaturization. While FIG. 3 depicts three electronic secondary stages 302-306, it will be appreciated that any number of electronic stages can be utilized in accordance with the present invention.

Thus, it should be clear from the preceding disclosure that the present invention provides an apparatus for regulating a gas supply for a fuel cell and other similar appliances. Advantageously, the apparatus provides the requisite precision at all expected gas flows, while operating at a sufficiently low power level for portable electronic applications.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

The invention claimed is:

1. A portable fuel cell system, comprising:
   a fuel cell; and
   a two-stage gas pressure regulator, comprising:
      a mechanical primary stage arranged to regulate a gas pressure; and
      an electronic secondary stage coupled to the mechanical primary stage and further comprising a micromachined pressure regulator.

2. The portable fuel cell system of claim 1, wherein the micromachined pressure regulator comprises a micromachined valve and a microcontroller.

3. The portable fuel cell system of claim 1, wherein the secondary stage is physically separated from the primary stage.

4. The portable fuel cell system of claim 1, further comprising a plurality of electronic secondary stages.

5. The portable fuel cell system of claim 1, further comprising a plurality of electronic secondary stages that are physically separated from the primary stage.

6. The portable fuel cell system of claim 1, wherein the primary stage comprises a spring valve.

7. The portable fuel cell system of claim 1,
   wherein the primary stage comprises a spring valve, and
   wherein the micromachined pressure regulator comprises a micromachined valve and a microcontroller and the electronic secondary stage is physically separated from the primary stage.

8. The portable fuel cell system of claim 1, wherein the mechanical primary stage is coupleable at an input to a gas fuel supply and the electronic secondary stage is coupled at an input to an output of the mechanical primary stage and the electronic secondary stage further comprises an output coupleable to an input of the fuel cell.

9. A two-stage gas pressure regulator, comprising:
   a mechanical primary stage arranged to regulate a gas pressure; and
   an electronic secondary stage coupleable to the mechanical primary stage and. further comprising a micromachined pressure regulator.

10. The gas pressure regulator of claim 9, wherein the micromachined pressure regulator comprises a micromachined valve and a microcontroller.

11. The gas pressure regulator of claim 9, wherein the secondary stage is physically separated from the primary stage.

12. The gas pressure regulator of claim 9, further comprising a plurality of electronic secondary stages.

13. The gas pressure regulator of claim 9, further comprising a plurality of electronic secondary stages that are physically separated from the primary stage.

14. The gas pressure regulator of claim 9, wherein the primary stage comprises a spring valve.

15. The two-stage gas pressure regulator of claim 1, wherein the mechanical primary stage is coupleable at an input to a gas fuel supply and the electronic secondary stage is coupled at an input to an output of the mechanical primary stage and the electronic secondary stage further comprises an output coupleable to an input of a fuel cell.

16. A gas pressure regulator, comprising:
 a mechanical primary stage comprising a spring valve arranged to regulate a gas pressure; and
 an electronic secondary stage coupled to the mechanical primary stage and comprising a micromachined pressure regulator.

17. The gas pressure regulator of claim 16, wherein the micromachined pressure regulator includes a micromachined valve and a microcontroller.

18. The gas pressure regulator of claim 16, wherein the secondary stage is physically separated from the primary stage.

19. The gas pressure regulator of claim 16, further comprising a plurality of electronic secondary stages comprising a micromachined pressure regulator.

20. The gas pressure regulator of claim 16, further comprising a plurality of electronic secondary stages comprising a micromachined pressure regulator including a micromachined valve and a microcontroller, the plurality of secondary stages physically separated from the primary stage.

21. The gas pressure regulator of claim 16 further comprising a plurality of electronic secondary stages.

22. The gas pressure regulator of claim 16 further comprising a plurality of electronic secondary stages that are physically separated from the primary stage.

* * * * *

UNITED STATES PATENT AND TRADEMARK OFFICE
CERTIFICATE OF CORRECTION

PATENT NO. : 7,264,896 B2 Page 1 of 1
APPLICATION NO. : 10/219582
DATED : September 4, 2007
INVENTOR(S) : Kelley et al.

It is certified that error appears in the above-identified patent and that said Letters Patent is hereby corrected as shown below:

In Column 4 line 65 please delete "1" and insert --9--

Signed and Sealed this

Twenty-seventh Day of November, 2007

JON W. DUDAS
*Director of the United States Patent and Trademark Office*